United States Patent
Kirk et al.

(10) Patent No.: US 10,284,525 B2
(45) Date of Patent: May 7, 2019

(54) CROSS-DOMAIN DATA-GATE FOR SECURE TRANSMISSION OF DATA OVER PUBLICLY SHARED DATALINKS

(71) Applicant: Honeywell International Inc., Morris Plains, NJ (US)

(72) Inventors: James Christopher Kirk, Clarksville, MD (US); Alexander Chernoguzov, Warrington, PA (US); Kevin Staggs, Peoria, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 165 days.

(21) Appl. No.: 15/206,724

(22) Filed: Jul. 11, 2016

(65) Prior Publication Data
US 2018/0013723 A1    Jan. 11, 2018

(51) Int. Cl.
*H04L 9/32* (2006.01)
*H04L 29/06* (2006.01)
(Continued)

(52) U.S. Cl.
CPC ....... *H04L 63/0272* (2013.01); *H04B 1/3822* (2013.01); *H04B 3/60* (2013.01);
(Continued)

(58) Field of Classification Search
CPC ............. H04L 63/0272; H04L 63/0428; H04L 63/0823; H04L 12/4641; H04W 72/042;
(Continued)

(56) References Cited

U.S. PATENT DOCUMENTS 5,896,499 A    4/1999 McKelvey
7,430,759 B2    9/2008 Piepiorra et al.
(Continued)

FOREIGN PATENT DOCUMENTS

WO    2016040920    3/2016

OTHER PUBLICATIONS

European Patent Office, "Extended European Search Report for EP Application No. 17178237.8", Foreign Counterpart to U.S. Appl. No. 15/206,724, dated Sep. 6, 2017, pp. 1-10, Published in: EP.
(Continued)

*Primary Examiner* — Haresh N Patel
(74) *Attorney, Agent, or Firm* — Bookoff McAndrews, PLLC (57) ABSTRACT

A device for secure transmission of vehicle data over vehicle datalinks that may be shared with passenger devices and are connected to a publicly shared network is provided. The device comprises a processor embedded within a portion of an Ethernet cable for a vehicle. A plurality of applications resides in the processor and comprises a VPN application, and a VPN address and certificate update application. A first Ethernet transceiver communicates with the processor through the VPN application and also communicates with onboard electronic equipment. A second Ethernet transceiver communicates with the processor through the VPN application and also communicates with an external datalink. The VPN application automatically establishes a VPN when the datalink is available, provides an authentication certificate to verify that the device is a correct and legitimate node, and verifies a VPN hosting certification to determine whether the device is communicating with a correct and legitimate external facility.

18 Claims, 3 Drawing Sheets

(51) Int. Cl.
  *H04B 1/3822* (2015.01)
  *H04L 12/46* (2006.01)
  *H04B 3/60* (2006.01)
  *H04B 7/185* (2006.01)
  *H04W 12/06* (2009.01)
  *H04W 72/04* (2009.01)
  *H04L 12/40* (2006.01)

(52) U.S. Cl.
  CPC ..... *H04B 7/18506* (2013.01); *H04L 12/4641* (2013.01); *H04L 63/0428* (2013.01); *H04L 63/0823* (2013.01); *H04W 12/06* (2013.01); *H04W 72/042* (2013.01); *H04W 72/0413* (2013.01); *H04L 2012/4028* (2013.01); *H04L 2012/40273* (2013.01)

(58) Field of Classification Search
  CPC .............. H04W 12/06; H04W 72/0413; H04B 1/3822; H04B 3/60; H04B 7/18506
  USPC ............................................................ 726/7
  See application file for complete search history.

(56) References Cited

U.S. PATENT DOCUMENTS

| | | | |
|---|---|---|---|
| 7,784,095 B2 | 8/2010 | Valenci | |
| 8,146,144 B2 | 3/2012 | Jaenicke | |
| 8,966,267 B1* | 2/2015 | Pahl | H04L 9/0844 380/273 |
| 9,673,988 B2* | 6/2017 | Larson | H04L 9/3263 726/2 |
| 2003/0032426 A1* | 2/2003 | Gilbert | H04W 84/02 455/427 |
| 2005/0183138 A1 | 8/2005 | Phillips et al. | |
| 2007/0025418 A1* | 2/2007 | Bay | H04B 1/406 375/130 |
| 2007/0032921 A1* | 2/2007 | Allen | G01C 23/005 701/3 |
| 2007/0129855 A1* | 6/2007 | Coulmeau | G08G 5/0039 701/3 |
| 2008/0072311 A1 | 3/2008 | Mullick et al. | |
| 2009/0010200 A1 | 1/2009 | Lauer et al. | |
| 2013/0298182 A1 | 11/2013 | May | |
| 2014/0223507 A1* | 8/2014 | Xu | H04L 63/0272 726/1 |
| 2015/0200738 A1 | 7/2015 | Wetterwald et al. | |
| 2016/0205724 A1* | 7/2016 | Shi | H04B 7/18506 370/254 |
| 2016/0248831 A1* | 8/2016 | Watson | G06F 17/30058 726/2 |
| 2016/0373275 A1* | 12/2016 | Al-Asaaed | H04L 12/4641 726/2 |
| 2016/0380868 A1* | 12/2016 | Hollis | H04L 47/10 370/252 |
| 2017/0078336 A1* | 3/2017 | Aluvala | H04L 65/1069 726/26 |
| 2017/0082745 A1* | 3/2017 | Kronfeld | G01S 13/953 726/2 |
| 2017/0187808 A1* | 6/2017 | Redgate | H04L 67/125 726/26 |
| 2017/0208469 A1* | 7/2017 | Mazzuca | H04W 12/08 726/24 |
| 2017/0272256 A1* | 9/2017 | Yang | H04L 9/3236 726/2 |

OTHER PUBLICATIONS

"mGuard smart2", retrieved Apr. 22, 2016 from http://www.phoenixcontact-cybersecurity.com/en/products/mguard-smart2, pp. 1-2.
European Patent Office, "Communication Pursuant to Article 94(3) from EP Application No. 17178237.8, dated Mar. 27, 2018", from Foreign Counterpart to U.S. Appl. No. 15/206,724, dated Mar. 27, 2018, pp. 1-4, Published in: EP.

* cited by examiner

CROSS-DOMAIN DATA-GATE FOR SECURE TRANSMISSION OF DATA OVER PUBLICLY SHARED DATALINKS

BACKGROUND

Aircraft are in a transition from a state in which the aircraft and crew are essentially autonomous while in flight, with the exception of air traffic control, to one in which the aircraft and its systems are in constant contact with the ground. Such constant contact is for the purposes of sending the monitoring of systems, logistics data, and providing to the aircraft timely information, such as map and weather data updates.

Air-to-ground (ATG) datalink systems are also transitioning. These datalink systems are expensive to install and maintain, and in the current aviation financial environment, the presence of such systems purely for avionics data is not generally acceptable. As the datalink systems move to much broader bandwidth, with associated increased costs, the presence of such broadband ATG is often for the purpose of pay-per-use by the passengers, or in the case of private aircraft, for business management reasons. This creates the situation where the avionics are being attached to the same ATG data "pipes" as the passengers, with the ATG IP link addresses for the aircraft shared with the passengers, and thus with the entire ground Internet. Such a situation introduces potential access by malicious actors to the aircraft systems.

Newer links and avionics boxes can be designed together to address and close gaps in security. However, legacy and third party systems designed independently often lack any easy way of introducing security into the link between the avionics and the ATG datalinks without the introduction of yet another appliance box, which must take up space in avionics racks or bays that are already crowded.

SUMMARY

A device for secure transmission of vehicle data over vehicle datalinks that may be shared with vehicle passenger devices and are connected to one or more publicly shared networks is provided. The device comprises a processor embedded within a portion of an Ethernet cable for a vehicle comprising an aircraft, a spacecraft, a watercraft, or an automotive ground vehicle. A plurality of processor executable applications resides in the processor, with the applications comprising a virtual private network (VPN) application, and a VPN address and certificate update application in operative communication with the VPN application. The processor includes a non-volatile memory unit that stores one or more authentication certificates, with the non-volatile memory unit in operative communication with the VPN address and certificate update application and the VPN application. A first Ethernet transceiver is in operative communication with the processor through the VPN application, with the first Ethernet transceiver configured to communicate with onboard electronic equipment. A second Ethernet transceiver is in operative communication with the processor through the VPN application, with the second Ethernet transceiver configured to communicate with a datalink external to the vehicle. The VPN application is configured to automatically establish a VPN when an external datalink is available, provide an authentication certificate to verify that the device is a correct and legitimate node, and verify a VPN hosting certification to determine whether the device is communicating with a correct and legitimate external facility.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for secure transmission of vehicle data over vehicle datalinks that may be shared with vehicle passenger devices and are connected to one or more publicly shared networks are provided. The present system and method employ a cross-domain data-gate device for the secure transmission of vehicle data. The data-gate device introduces security isolation into a data communication system without having to add another equipment box on a vehicle.

While the present approach for secure transmission of vehicle data is particularly suited for data transmissions to and from an aircraft, the present approach may also be applied to data communications for other vehicles, such as spacecraft, watercraft, cars or other automotive ground vehicles.

The present system provides for implementation of an encryption or encryption/decryption channel in the data-gate device, which can be embedded in a cable between two other devices, at least one of which does not have the desired encryption algorithm (if any). The embedded data-gate device is programmable at the time of installation of the cable, and may be updateable remotely.

In one embodiment, a data-gate device includes a small processor package that is molded into an aircraft cable that runs from an avionics box to an air-to-ground (ATG) datalink. The processor package provides the needed firewall and isolation for the single link between the avionics box and the ATG datalink, and works in concert with a dedicated ground station equipped to coordinate with the processor package. In one embodiment, the processor package provides the firewall and isolation for a single avionics line replaceable unit (LRU) such that in legacy situations, the LRU can be connected to a passenger data pipe in an aircraft.

The data-gate device and dedicated ground station together provide a secure link from any Internet Protocol (IP) based avionics box communications port to a ground facility that needs to communicate with the avionics box. The present approach works with one avionics box, but as many cables may be employed on an aircraft as the ATG datalink can support in terms of data rate to provide a secure link mechanism to the ground.

The data-gate device generally includes an Ethernet avionics port, an Ethernet ATG port, a processor, a secure key storage hardware function, a software firewall application, a Virtual Private Network (VPN) software application, a software traffic monitor and reporting system, and a software key and destination IP list updating system. The device includes a unique identifier, a public key infrastructure (PKI) certificate, and an encryption key stored in a secure key store component. The device can be provided with power from the avionics box side of the cable, the ATG side of the cable, or from another source.

The dedicated ground station includes a software application that is resident on a convenient server or Internet connected processor, which may be on the ground or anywhere that has Internet access. The software application has a key storage capability; a VPN software component; a traffic monitor and reporting system receiving point software component; and a storage, forwarding, and reporting software component.

On installation, and given first access to the ground Internet via the ATG box, the processor in the data-gate device seeks a default IP address for an instantiation of a "management" ground station, and runs an initial configuration for the ground station from information stored at the ground station for that particular device. The ground station will exchange certificates to verify the device, and then run a setup routine that will tell that specific device what IP to use to run routine communications (the "client" ground station), and will accept and load any additional client certificates required to run the VPN tunnel to that appointed IP.

Once loaded, the device will communicate with the client ground station and perform final security configurations. Once so configured, the device will, on power-up, always seek the client ground station to establish the link. The link is then used anytime it is established by powering on the device. Data will flow automatically from the device to the client ground station, where the data will be provided or stored, forwarded, or used as the client desires.

Once the client ground station link is established, the client ground station may update device client certificates and keys as required. Unique identifiers for the device cannot be accessed or changed by the client or management ground station, and unique identifier PKI certificates can only be changed by the management ground station. This configuration permits the device software to be loaded with client certificates that the client has not had to share with any other party, including the managers of the management ground station.

Should problems with the client ground station occur, such that the device cannot connect with the client ground station, then the device will defer to the management ground station where it will be reinitialized and reset with new information for the client (or reloaded with the old information if there has been no change).

The owner of the client ground station will be required to update the management ground station with any new IP information, or initial setup certificate and key information, in order to ensure that the device will re-establish contact with the client ground station should a change at the client ground station occur that could not be properly configured before a break in communications occurred.

Further details of the present system and method are described hereafter with reference to the drawings.

Figure 1:
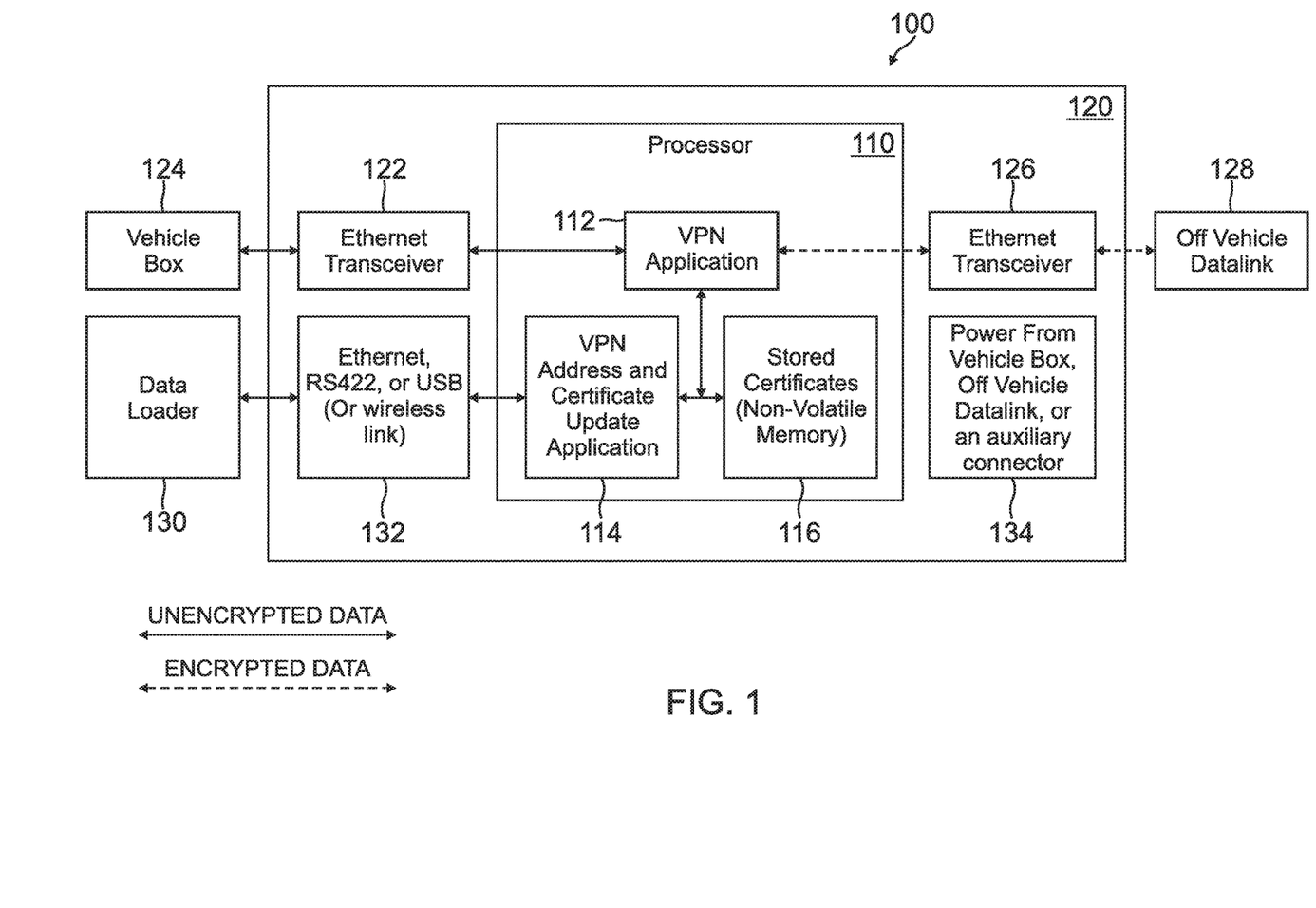
FIG. 1 is a block diagram of a device for secure transmission of vehicle data over publicly shared datalinks, according to one embodiment.

FIG. 1 illustrates a device 100 for secure transmission of vehicle data over publicly shared vehicle datalinks, such as may be used by vehicle passenger devices, which are connected to publicly shared networks such as the Internet. The device 100 includes a processor 110 embedded within a bulge portion 120 of a data communications cable, such as an Ethernet cable, in a vehicle. Various processor executable applications reside in processor 110 in one or more memory units. The applications include a virtual private network (VPN) application 112, and a VPN address and certificate update application 114 that is in operative communication with VPN application 112. The processor also includes a non-volatile memory unit 116 that stores one or more authentication certificates. The non-volatile memory unit 116 is in operative communication with the one or more memory units where VPN address and certificate update application 114 and VPN application 112 reside.

The device 100 also includes a first Ethernet transceiver 122 in operative communication with processor 110 through VPN application 112. The Ethernet transceiver 122 is configured to communicate with onboard electronic equipment in a vehicle box 124. A second Ethernet transceiver 126 in device 100 is also in operative communication with processor 110 through VPN application 112. The Ethernet transceiver 126 is configured to communicate with an off vehicle datalink 128 external to the vehicle.

The VPN application 112 is configured to automatically establish a VPN when an external datalink is available. The VPN application 112 provides an authentication certificate to verify device 100 is a correct and legitimate node, and verifies a VPN hosting certification to determine whether device 100 is communicating with a correct and legitimate external facility.

The processor 110 can also operatively communicate with an onboard data loader 130 through a data communication medium 132, such as an Ethernet line, RS422 circuit, universal serial bus (USB) port, or wireless link. In one embodiment, data loader 130 can be a standard industry data loader, and can be connected to device 100 through use of open pins on an existing connector, use of an auxiliary connector on device 100, or by an embedded wireless link in device 100. The data communication medium 132 operatively communicates with VPN address and certificate update application 114 in processor 110. In addition, a power supply 134 for device 100 can be provided by vehicle box 124, off vehicle datalink 128, or an auxiliary connector.

During operation of device 100, VPN application 112 sends or receives encrypted data to or from off vehicle datalink 128 through Ethernet transceiver 126. The VPN application 112 also sends or receives unencrypted data to or from vehicle box 124 through Ethernet transceiver 122.

Figure 2:
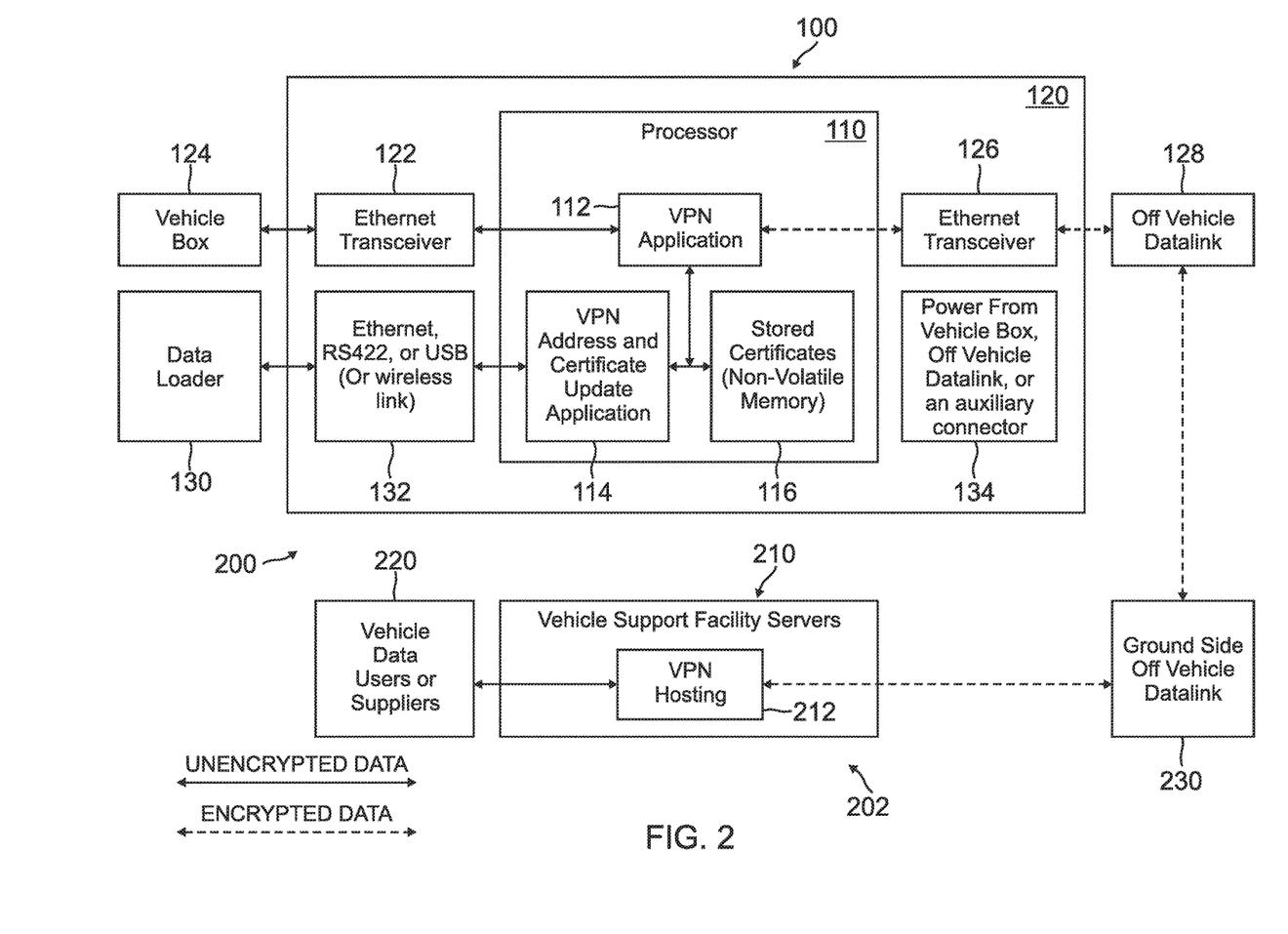
FIG. 2 is a block diagram of a system for secure transmission of vehicle data over publicly shared datalinks, in which the device of FIG. 1 communicates with a ground facility according to one embodiment.

FIG. 2 illustrates a system 200 for secure transmission of vehicle data over publicly shared datalinks, in which device 100 communicates with a ground facility 202 according to one embodiment. The ground facility 202 includes one or more vehicle support facility servers 210 that contain a VPN hosting module 212. The vehicle support facility servers 210 operatively communicate with one or more vehicle data users or suppliers 220 through VPN hosting module 212. The vehicle support facility servers 210 also operatively communicate with a ground side off vehicle datalink 230 through VPN hosting module 212.

The VPN hosting module 212 is configured to automatically establish a VPN any time it receives a datalink request, such as from device 100 through off vehicle data link 128. The VPN hosting module 212 also provides authentication certificates to verify a vehicle support facility server is a correct and legitimate host, and verifies VPN application certification to verify the vehicle support facility server is communicating with a correct and legitimate vehicle node, such as device 100.

During operation of system 200, encrypted data is transmitted between device 100 and vehicle support facility servers 210 through off vehicle datalink 128 and ground side off vehicle datalink 230. In a downlink transmission example, VPN application 112 receives unencrypted data from vehicle box 124 through Ethernet transceiver 122. The VPN application 112 encrypts the data received from vehicle box 124, and sends the encrypted data to off vehicle datalink 128 through Ethernet transceiver 126. The encrypted data is then sent from off vehicle datalink 128 to the ground side off vehicle datalink 230, which transmits the encrypted data to VPN hosting module 212. The VPN hosting module 212 decrypts the encrypted data, and sends the unencrypted data to vehicle data users or suppliers 220.

In an uplink transmission example, VPN hosting module 212 receives unencrypted data from data users or suppliers 220, encrypts the unencrypted data, and sends the encrypted data to ground side off vehicle datalink 230, which transmits the encrypted data to off vehicle datalink 128. The VPN application 112 in device 100 receives the encrypted data from off vehicle datalink 128 through Ethernet transceiver 126. The VPN application 112 then decrypts the received encrypted data, and sends the unencrypted data to vehicle box 124 through Ethernet transceiver 122.

Figure 3:
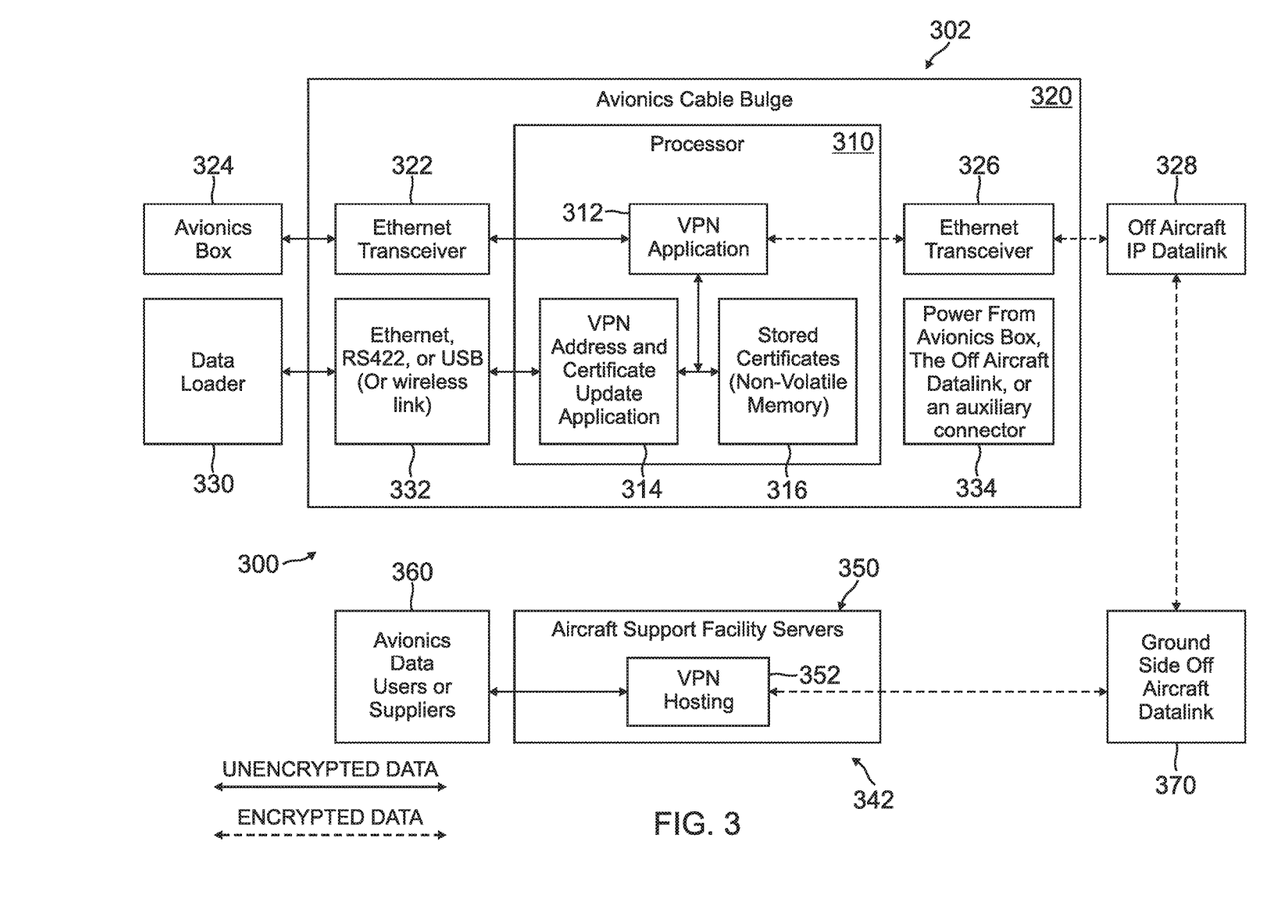
FIG. 3 is a block diagram of a system for secure transmission of avionics data over publicly shared datalinks, according to one embodiment.

FIG. 3 illustrates a system 300 for secure transmission of avionics data over publicly shared datalinks between an aircraft and the ground, according to one embodiment. A device 302 in the aircraft includes a microprocessor 310 embedded within an avionics cable bulge portion 320 of a data communications cable, such as an Ethernet cable. Various processor executable applications reside in microprocessor 310, including a VPN application 312, and a VPN address and certificate update application 314. In addition, a non-volatile memory unit 316 stores one or more authentication certificates.

The device 302 also includes a first Ethernet transceiver 322 in operative communication with microprocessor 310 through VPN application 312. The Ethernet transceiver 322 is configured to communicate with onboard electronic equipment in an avionics box 324. A second Ethernet transceiver 326 in device 302 is also in operative communication with microprocessor 310 through VPN application 312. The Ethernet transceiver 326 is configured to communicate with an off aircraft IP datalink 328. The VPN application 312 operates in a similar manner as described above for VPN application 112 (FIG. 1)

The microprocessor 310 can also operatively communicate with an onboard data loader 330 through a data communication medium 332, such as an Ethernet line, RS422 circuit, USB port, or wireless link. The data communication medium 332 operatively communicates with VPN address and certificate update application 314 in microprocessor 310. In addition, a power supply 334 for device 302 can be provided by avionics box 324, off aircraft IP datalink 328, or an auxiliary connector.

The device 302 communicates with a ground facility 342, which includes one or more aircraft support facility servers 350 that contain a VPN hosting module 352. The aircraft support facility servers 350 operatively communicate with one or more avionics data users or suppliers 360 through VPN hosting module 352. The aircraft support facility servers 350 also operatively communicate with a ground side off aircraft datalink 370 through VPN hosting module 352. The VPN hosting module 352 operates in a similar manner as described above for VPN hosting module 212 (FIG. 2)

During operation of system 300, encrypted data is transmitted between device 302 and aircraft support facility servers 350 through off aircraft IP datalink 328 and ground side off aircraft datalink 370. In a downlink transmission example, VPN application 312 receives unencrypted data from avionics box 324 through Ethernet transceiver 322, encrypts the received data, and sends the encrypted data to off aircraft IP datalink 328 through Ethernet transceiver 326. The encrypted data is then sent from off aircraft IP datalink 328 to the ground side off aircraft datalink 370, which transmits the encrypted data to VPN hosting module 352. The VPN hosting module 352 decrypts the encrypted data, and sends the unencrypted data to avionics data users or suppliers 360.

In an uplink transmission example, VPN hosting module 352 receives unencrypted data from avionics data users or suppliers 360, encrypts the unencrypted data, and sends the encrypted data to ground side off aircraft datalink 370, which transmits the encrypted data to off aircraft IP datalink 328. The VPN application 312 in device 302 receives the encrypted data from off aircraft IP datalink 328 through Ethernet transceiver 326. The VPN application 312 decrypts the received encrypted data, and sends the unencrypted data to avionics box 324 through Ethernet transceiver 322.

The system 300 has the advantage of permitting avionics box 324 to be connected to less secure datalinks without modification of avionics box 324, nor upgrading the certification of avionics box 324 or the datalink. In addition, updating of the VPN certificates or addresses does not require updating the software of avionics box 324, resulting in a simpler data load package to prepare. This provides a single solution that can be type certified on multiple aircraft for use on multiple avionics boxes, and permits the avionics boxes to be "swapped out" without having to reprogram and data load new certificates into new avionics boxes.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, DVDs, Blu-ray discs, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

Example Embodiments

Example 1 includes a device for secure transmission of vehicle data over vehicle datalinks that may be shared with vehicle passenger devices and are connected to one or more publicly shared networks, the device comprising: a processor embedded within a portion of an Ethernet cable for a vehicle comprising an aircraft, a spacecraft, a watercraft, or an automotive ground vehicle, wherein a plurality of processor executable applications resides in the processor, the applications comprising a virtual private network (VPN) application and a VPN address and certificate update application in operative communication with the VPN application; wherein the processor includes a non-volatile memory unit that stores one or more authentication certificates, the non-volatile memory unit in operative communication with the VPN address and certificate update application and the VPN application; a first Ethernet transceiver in operative communication with the processor through the VPN application, the first Ethernet transceiver configured to communicate with onboard electronic equipment; a second Ethernet transceiver in operative communication with the processor through the VPN application, the second Ethernet transceiver configured to communicate with a datalink external to the vehicle; wherein the VPN application is configured to automatically establish a VPN when an external datalink is available, provide an authentication certificate to verify that the device is a correct and legitimate node, and verify a VPN hosting certification to determine whether the device is communicating with a correct and legitimate external facility.

Example 2 includes the device of Example 1, wherein the one or more publicly shared networks include the Internet.

Example 3 includes the device of any of Examples 1-2, wherein the processor operatively communicates with an onboard data loader through a data communication medium.

Example 4 includes the device of Example 3, wherein the data communication medium comprises an Ethernet line, an RS422 circuit, a universal serial bus (USB), or a wireless link.

Example 5 includes the device of any of Examples 3-4, wherein the data communication medium operatively communicates with the VPN address and certificate update application.

Example 6 includes the device of any of Examples 1-5, wherein the external datalink operatively communicates with a vehicle support facility server that contains a VPN hosting module.

Example 7 includes the device of Example 6, wherein the vehicle support facility server operatively communicates with one or more vehicle data users or suppliers through the VPN hosting module.

Example 8 includes the device of any of Examples 6-7, wherein the VPN hosting module is configured to automatically establish a VPN any time a datalink request is received; provide an authentication certificate to verify the vehicle support facility server is a correct and legitimate host; and verify a VPN application certification to determine whether the vehicle support facility server is communicating with a correct and legitimate vehicle node.

Example 9 includes a system for secure transmission of avionics data over aircraft datalinks that may be shared with aircraft passenger devices and are connected to one or more publicly shared networks, the system comprising: a data-gate device comprising a processor embedded within a portion of an Ethernet cable in an aircraft, wherein a plurality of processor executable applications resides in the processor, the applications comprising a virtual private network (VPN) application and a VPN address and certificate update application in operative communication with the VPN application; wherein the processor includes a non-volatile memory unit that stores one or more authentication certificates, the non-volatile memory unit in operative communication with the VPN address and certificate update application and the VPN application; a first Ethernet transceiver in operative communication with the processor through the VPN application, the first Ethernet transceiver configured to communicate with avionics equipment onboard the aircraft; a second Ethernet transceiver in operative communication with the processor through the VPN application, the second Ethernet transceiver configured to communicate with an external off aircraft datalink; and a ground facility configured for operative communication with the data-gate device, the ground facility comprising one or more aircraft support facility servers that contain a VPN hosting module, the one or more aircraft support facility servers in operative communication with one or more avionics data users or suppliers through the VPN hosting module; wherein the one or more aircraft support facility servers operatively communicate with a ground side off aircraft datalink through the VPN hosting module; wherein the VPN application is configured to automatically establish a VPN when the external off aircraft datalink is available, provide an authentication certificate to verify that the data-gate device is a correct and legitimate node, and verify a VPN hosting certification to determine whether the ground facility is a correct and legitimate external facility for communication; wherein the VPN hosting module is configured to automatically establish a VPN when a datalink request is received, provide an authentication certificate to verify the vehicle support facility server is a correct and legitimate host, and verify a certification from the VPN application to determine whether the data-gate device on the aircraft is a correct and legitimate aircraft node for communication.

Example 10 includes the system of Example 9, wherein the one or more publicly shared networks include the Internet.

Example 11 includes the system of any of Examples 9-10, wherein the processor operatively communicates with an onboard data loader through a data communication medium.

Example 12 includes the system of Example 11, wherein the data communication medium comprises an Ethernet line, an RS422 circuit, a universal serial bus (USB), or a wireless link.

Example 13 includes the system of any of Examples 11-12, wherein the data communication medium operatively communicates with the VPN address and certificate update application.

Example 14 includes a method for secure transmission of vehicle data over vehicle datalinks that may be shared with vehicle passenger devices and are connected to one or more publicly shared networks, the method comprising: providing a data-gate device that is operatively coupled to onboard electronic equipment in a vehicle, the data-gate device including a processor embedded within a portion of an Ethernet cable in the vehicle, the processor including a virtual private network (VPN) application; establishing a VPN when an external datalink is available; generating an authentication certificate to verify that the data-gate device is a correct and legitimate node; and verifying a received VPN hosting certification to determine whether the data-gate device is communicating with a correct and legitimate external facility.

Example 15 includes the method of Example 14, wherein during a downlink transmission, the method further comprising: sending unencrypted data from the onboard electronic equipment through a first Ethernet transceiver to the processor; encrypting the unencrypted data in the VPN application; sending the encrypted data to an external off vehicle datalink through a second Ethernet transceiver; transmitting the encrypted data from the external off vehicle datalink to a ground side off vehicle datalink; transmitting the encrypted data from the ground side off vehicle datalink to a VPN hosting module in one or more vehicle support facility servers; and decrypting the encrypted data for transmission to one or more vehicle data users or suppliers.

Example 16 includes the method of any of Examples 14-15, wherein during an uplink transmission, the method further comprising: receiving unencrypted ground side data at the one or more vehicle support facility servers from the one or more data users or suppliers; encrypting the ground side data in the VPN hosting module; sending the encrypted ground side data to the ground side off vehicle datalink; transmitting the encrypted ground side data from the ground side off vehicle datalink to the external off vehicle datalink; receiving in the processor the encrypted ground side data from the external off vehicle datalink through the second Ethernet transceiver; decrypting the received encrypted ground side data in the VPN application; and sending the decrypted ground side data to the onboard vehicle equipment through the first Ethernet transceiver.

Example 17 includes the method of any of Examples 14-16, wherein the one or more publicly shared networks include the Internet.

Example 18 includes the method of any of Examples 14-17, wherein the vehicle comprises an aircraft, a spacecraft, a watercraft, or an automotive ground vehicle.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A device for secure transmission of vehicle data over vehicle datalinks connected to one or more publicly shared networks, the device comprising:
   a processor embedded within a portion of an Ethernet cable for a vehicle, the Ethernet cable operatively coupled to a vehicle data box and to an air-to-ground (ATG) datalink such that the Ethernet cable runs from the vehicle data box to the ATG datalink, wherein a plurality of processor executable applications resides in the processor, the applications comprising:
   a virtual private network (VPN) application; and
   a VPN address and certificate update application in operative communication with the VPN application;
   wherein the processor includes a non-volatile memory unit that stores one or more authentication certificates, the non-volatile memory unit in operative communication with the VPN address and certificate update application and the VPN application;
   a first Ethernet transceiver in operative communication with the processor through the VPN application, the first Ethernet transceiver configured to communicate with the vehicle data box;
   a second Ethernet transceiver in operative communication with the processor through the VPN application, the second Ethernet transceiver configured to communicate with the ATG datalink external to the vehicle; wherein the VPN application is configured to:
   automatically establish a VPN when an the external ATG datalink is available;
   provide an authentication certificate to verify that the device is a correct and legitimate node; and
   verify a VPN hosting certification to determine whether the device is communicating with a correct and legitimate external facility.

2. The device of claim 1, wherein the one or more publicly shared networks include the Internet.

3. The device of claim 1, wherein the processor operatively communicates with an onboard data loader through a data communication medium.

4. The device of claim 3, wherein the data communication medium comprises an Ethernet line, an RS422 circuit, a universal serial bus (USB), or a wireless link.

5. The device of claim 4, wherein the data communication medium operatively communicates with the VPN address and certificate update application.

6. The device of claim 1, wherein the external ATG datalink operatively communicates with a vehicle support facility server that contains a VPN hosting module.

7. The device of claim 6, wherein the vehicle support facility server operatively communicates with one or more vehicle data users or suppliers through the VPN hosting module.

8. The device of claim 6, wherein the VPN hosting module is configured to:
   automatically establish a VPN any time a datalink request is received;
   provide an authentication certificate to verify the vehicle support facility server is a correct and legitimate host; and
   verify a VPN application certification to determine whether the vehicle support facility server is communicating with a correct and legitimate vehicle node.

9. A system for secure transmission of avionics data over aircraft datalinks connected to one or more publicly shared networks, the system comprising:
   a data-gate device comprising:
   a processor embedded within a portion of an Ethernet cable in an aircraft, the Ethernet cable operatively coupled to an avionics box and to an external off aircraft air-to-ground (ATG) datalink such that the Ethernet cable runs from the avionics box to the ATG datalink, wherein a plurality of processor executable applications resides in the processor, the applications comprising:

a virtual private network (VPN) application; and
a VPN address and certificate update application in operative communication with the VPN application;
wherein the processor includes a non-volatile memory unit that stores one or more authentication certificates, the non-volatile memory unit in operative communication with the VPN address and certificate update application and the VPN application;
a first Ethernet transceiver in operative communication with the processor through the VPN application, the first Ethernet transceiver configured to communicate with the avionics box onboard the aircraft;
a second Ethernet transceiver in operative communication with the processor through the VPN application, the second Ethernet transceiver configured to communicate with the ATG datalink; and
a ground facility configured for operative communication with the data-gate device, the ground facility comprising:
one or more aircraft support facility servers that contain a VPN hosting module, the one or more aircraft support facility servers in operative communication with one or more avionics data users or suppliers through the VPN hosting module;
wherein the one or more aircraft support facility servers operatively communicate with a ground side off aircraft datalink through the VPN hosting module;
wherein the VPN application is configured to:
automatically establish a VPN when the external off aircraft ATG datalink is available;
provide an authentication certificate to verify that the data-gate device is a correct and legitimate node; and
verify a VPN hosting certification to determine whether the ground facility is a correct and legitimate external facility for communication;
wherein the VPN hosting module is configured to:
automatically establish a VPN when a datalink request is received;
provide an authentication certificate to verify the vehicle support facility server is a correct and legitimate host; and
verify a certification from the VPN application to determine whether the data-gate device on the aircraft is a correct and legitimate aircraft node for communication.

10. The system of claim 9, wherein the one or more publicly shared networks include the Internet.

11. The system of claim 9, wherein the processor operatively communicates with an onboard data loader through a data communication medium.

12. The system of claim 11, wherein the data communication medium comprises an Ethernet line, an RS422 circuit, a universal serial bus (USB), or a wireless link.

13. The system of claim 11, wherein the data communication medium operatively communicates with the VPN address and certificate update application.

14. A method for secure transmission of vehicle data over vehicle datalinks connected to one or more publicly shared networks, the method comprising:
providing a data-gate device that is operatively coupled to a vehicle data box in a vehicle and operatively coupled to an external air-to-ground (ATG) datalink, the data-gate device including a processor embedded within a portion of an Ethernet cable in the vehicle running from the vehicle data box to the ATG datalink, the processor including a virtual private network (VPN) application;
establishing a VPN when the ATG datalink is available;
generating an authentication certificate to verify that the data-gate device is a correct and legitimate node; and
verifying a received VPN hosting certification to determine whether the data-gate device is communicating with a correct and legitimate external facility.

15. The method of claim 14, wherein during a downlink transmission, the method further comprising:
sending unencrypted data from the vehicle data box through a first Ethernet transceiver to the processor;
encrypting the unencrypted data in the VPN application;
sending the encrypted data to an external off vehicle ATG datalink through a second Ethernet transceiver;
transmitting the encrypted data from the external off vehicle ATG datalink to a ground side off vehicle datalink;
transmitting the encrypted data from the ground side off vehicle datalink to a VPN hosting module in one or more vehicle support facility servers; and
decrypting the encrypted data for transmission to one or more vehicle data users or suppliers.

16. The method of claim 15, wherein during an uplink transmission, the method further comprising:
receiving unencrypted ground side data at the one or more vehicle support facility servers from the one or more data users or suppliers;
encrypting the ground side data in the VPN hosting module;
sending the encrypted ground side data to the ground side off vehicle datalink;
transmitting the encrypted ground side data from the ground side off vehicle datalink to the external off vehicle ATG datalink;
receiving in the processor the encrypted ground side data from the external off vehicle ATG datalink through the second Ethernet transceiver;
decrypting the received encrypted ground side data in the VPN application; and sending the decrypted ground side data to the vehicle data box through the first Ethernet transceiver.

17. The method of claim 14, wherein the one or more publicly shared networks include the Internet.

18. The method of claim 14, wherein the vehicle comprises an aircraft, a spacecraft, a watercraft, or an automotive ground vehicle.

* * * * *